US012687464B2

(12) United States Patent    (10) Patent No.: US 12,687,464 B2

Pora et al.    (45) Date of Patent: Jul. 21, 2026

(54) METHOD FOR ESTIMATING A DRIFT OF A TURBINE ENGINE FUEL PUMP

(71) Applicant: Safran Aircraft Engines, Paris (FR)

(72) Inventors: Loïc Pora, Moissy-Cramayel (FR); Virgile Nicolas Bastien Garnier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 263 days.

(21) Appl. No.: 18/717,895

(22) PCT Filed: Dec. 6, 2022

(86) PCT No.: PCT/FR2022/052259

§ 371 (c)(1),
(2) Date: Jun. 7, 2024

(87) PCT Pub. No.: WO2023/105157

PCT Pub. Date: Jun. 15, 2023

(65) Prior Publication Data

US 2025/0044194 A1    Feb. 6, 2025

(30) Foreign Application Priority Data

Dec. 9, 2021    (FR) ...................................... 2113231

(51) Int. Cl.
   *G01M 15/14*    (2006.01)
   *F02C 7/232*    (2006.01)
   *F23R 3/28*    (2006.01)
(52) U.S. Cl.
   CPC ............. *G01M 15/14* (2013.01); *F02C 7/232* (2013.01); *F23R 3/28* (2013.01)

(58) Field of Classification Search
   CPC ........... G01M 15/14; F02C 7/232; F23R 3/28
   See application file for complete search history.

(56) References Cited

U.S. PATENT DOCUMENTS

| | | | |
|---|---|---|---|
| 5,111,653 A | 5/1992 | Leeson | |
| 7,431,015 B2 | 10/2008 | Mahoney et al. | |
| 9,850,853 B2 * | 12/2017 | Dudar | ................ F02M 25/0809 |
| 2012/0219429 A1 | 8/2012 | Heitz | |
| 2015/0027411 A1 * | 1/2015 | Nieddu | ............... F02D 41/1401 |
| | | | 123/456 |

FOREIGN PATENT DOCUMENTS

| | | | | |
|---|---|---|---|---|
| CN | 109506723 A | * | 3/2019 | ............... G01F 1/36 |
| FR | 3 094 086 A1 | | 9/2020 | |
| JP | 2016142149 A | * | 8/2016 | |

* cited by examiner

*Primary Examiner* — Chico A Foxx

(74) *Attorney, Agent, or Firm* — Birch, Stewart, Kolasch & Birch, LLP

(57) ABSTRACT

The invention relates to a method which comprises the following steps: —measuring a pressure difference at terminals of a metering device (22) supplied with fuel by a pump (20); —calculating a position of a valve (24) regulating the pressure difference; —determining at least one estimated position of the valve from the pressure difference and at least one reference function giving the pressure difference as a function of the position; —calculating at least one value representing a drift of the pump (20) using the calculated position and the estimated position; and —comparing the value with a predetermined threshold.

10 Claims, 3 Drawing Sheets

FIG. 5
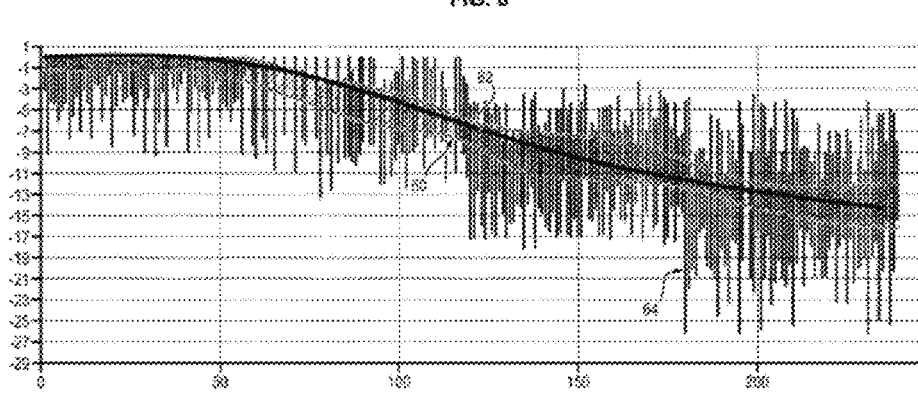
FIG. 6
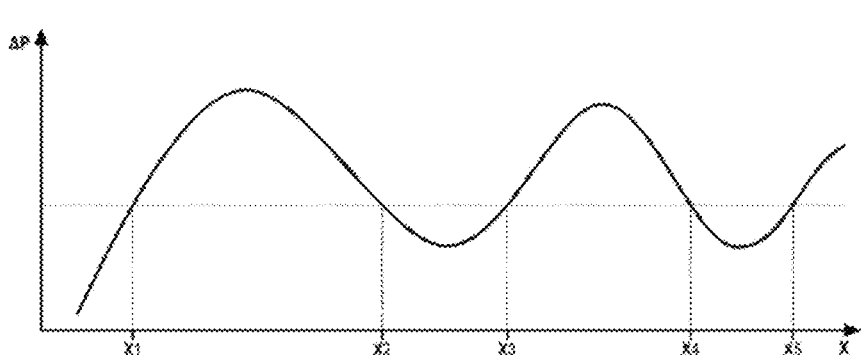
FIG. 7

METHOD FOR ESTIMATING A DRIFT OF A TURBINE ENGINE FUEL PUMP

FIELD OF THE INVENTION

The invention relates to turbine engine fuel circuits.

PRIOR ART

During its operation, turbojet burns fuel in its combustion chambers. To this end pumps, in particular a main pump, inject fuel into the chambers by means of a hydromechanical metering block (also designated by the acronym FMU for fuel metering unit). The latter has the role of metering the correct quantity of fuel to be injected into the engine and to recirculate the excess upstream of the fuel circuit. This hydromechanical block is linked with the injectors and the pumping block and is controlled by an electronic box.

What interests us here is the aging of the main fuel pump. In fact, after prolonged operation, certain of its characteristics evolve. This can be due to modifications of clearances, to the formation of scratches or to modification of tooth profiles linked to cavitation. In an extreme case, it would be possible that the pump is no longer able to supply enough fuel flow when an in-flight restart is required, even if the fuel flow rate was sufficient for starting on the ground.

It is not possible to know the potential flow rate of the main pump unless a reproducible test procedure is provided, as well as the integration of a flow rate sensor in the fuel circuit.

Currently, the condition of the pump is checked by following the product support service advice of the builder. At regular time intervals, the pump is tested to verify its correct operation. This test is carried out in the technical facilities of the company or by return to the supplier. Thus, to avoid reaching the maximum potential of the pump, preventive maintenance is recommended, but it is not compulsory. If such maintenance occurs, it requires testing means or the availability of replacement parts, or even immobilization of the engine. If deterioration is observed, the part is replaced without it being possible to determine the real operating time prior to degradation, or even the operating condition having caused the latter.

In certain turbojet engines, verification occurs during starting by observing the rotation speed that is necessary for setting in motion certain variable geometries, but this technique returns a large number of erroneous warnings.

One object of the invention is to evaluate the wear of the pump more easily to avoid unnecessary disassemblies, continuously ensure the operating margins and if necessary send a preventive warning regarding the pump.

DISCLOSURE OF THE INVENTION

To this end, a method is provided according to the invention for estimating a drift of a turbine engine fuel pump, the method comprising the following steps:

measuring a pressure difference at the terminals of a metering device supplied with fuel by the pump;

calculating a position of a valve regulating the pressure difference;

determining at least one estimated position of the valve based on the pressure difference and on at least one reference function giving the pressure difference as a function of the position;

calculating at least one value representing a drift of the pump by means of the calculated position and of the estimated position; and comparing the value with a predetermined threshold.

Thus the invention takes into account the interaction between the flow rate passing through the pump and that recirculated through the regulating valve in order to determine the aging of the pump. It implements an analysis of the drift of the pump by using the electomechanical metering block and the control means. It relies on the characterization of a law linking the pressure difference at the terminals of the metering device and the opening of the valve. During its operation, the computer takes into account a value of the pressure difference measured at the terminals of the metering device to obtain the estimated opening of the valve and compare it to the calculated opening. This gap reflects a difference between the flow rate obtained during the first use of the pump and that obtained with the pump after a period of operation. By allowing estimating the extent of the aging of the pump, the invention procures improvements in maintenance time. It also allows preventively warning regarding the extent of aging in order to trigger disassembly, if necessary, without waiting for a breakdown to occur, such as the impossibility of restarting the engine.

In one embodiment, the method comprises a determination of the reference function(s).

Advantageously, the determination of the function occurs after delivery of the turbine engine and before commercial exploitation of the turbine engine.

In fact, acquisition can occur through tests during the reception of the turbine engine. These tests will take into account errors linked to variations of the leakage flow rate of the rest of the system. If the accuracy is not sufficient, it is possible to apply a correction coefficient.

Preferably:

two estimated positions of the valve are determined based on the pressure difference and on two reference functions giving the pressure difference as a function of the position;

two values representing the drift of the pump are calculated by means of the calculated position and of the estimated positions; and at least one of the values is compared with the predetermined threshold.

It can be provided that:

at least one instantaneous value is calculated by means of the calculated position and the estimated position; and at least one average value representing the drift of the pump is updated by means of the instantaneous value.

It can be provided that:

two instantaneous values are calculated by means of the calculated position and the estimated positions; and two average values representing the drift of the pump are updated by means of the instantaneous values.

It can be provided that the or each average is a moving average.

Also provided according to the invention is a turbine engine fuel circuit, the circuit comprising:

at least one pump, one metering device configured to be supplied with fuel by the pump, the metering device comprising a sensor of a pressure difference at the terminals of the metering device, one valve configured to regulate a pressure difference at the terminals of the metering device, and means able to control the implementation of a method according to the invention.

In one embodiment, the pump is a positive displacement pump.

Also provided according to the invention is a turbine engine comprising a fuel circuit according to the invention.

DESCRIPTION OF THE FIGURES

We will now present an embodiment of the invention by way of a non-limiting example supporting the drawings in which:

FIG. 5 is a flowchart of the steps of the method of the invention in the present mode of implementation;

FIG. 6 is a curve representing the drift % Q of the flow rate associated with the aging of the pump as a function of time; and FIG. 7 is a view similar to FIG. 4 in another example.

DESCRIPTION OF THE ENGINE

Figure 1:
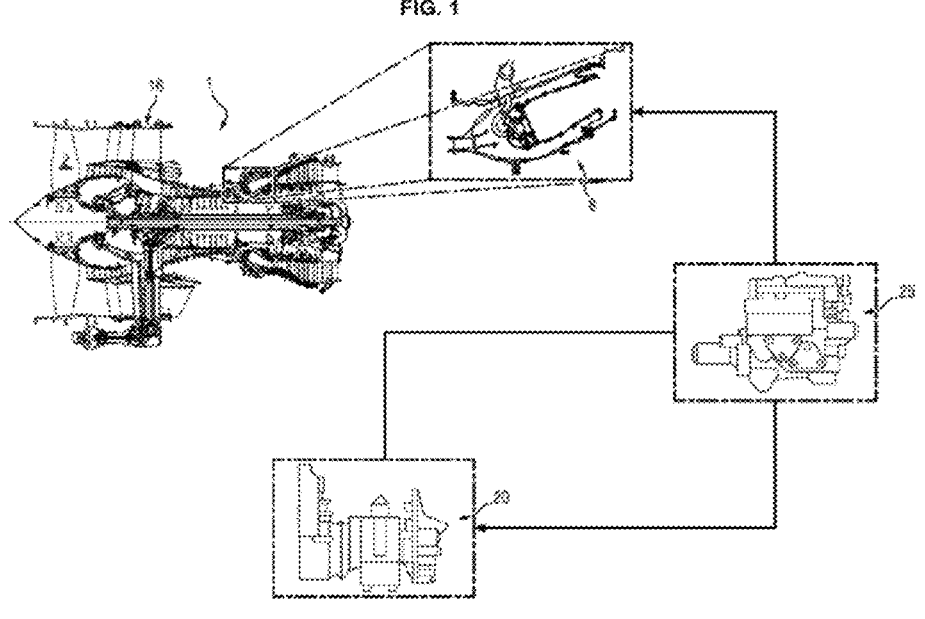
FIG. 1 is a diagram illustrating the fuel circuit within a turbine engine for one embodiment of the invention.

In the present example, an aircraft turbojet 1 forming a double flow double body turbine engine, comprising a stator and a rotor, is considered. It has a main axis which serves as an axis of rotation of the rotor relative to the stator. It comprises, from upstream to downstream, hence from left to right in FIG. 1, a fan 2, a low-pressure compressor, a high-pressure compressor, one or more combustion chambers 8, a high-pressure turbine and a low-pressure turbine. These elements, with the exception of the fan, are part of a central portion of the turbojet. Their portions that are movable in rotation around the axis form the rotor.

The high-pressure compressor, the combustion chamber 8 and the high-pressure turbine form a high-pressure body which, jointly with the low-pressure compressor and the low-pressure turbine, defines a main airflow stream.

A fan casing 16 surrounds the fan 2 and the central portion so as to form a fan compartment and define a secondary airflow stream.

With reference to FIG. 1, during its operation, the turbojet 1 burns fuel in its combustion chambers 8.

For this purpose, it comprises a fuel circuit 7 comprising:
at least one pump 20,
one metering device 22 configured to be supplied with fuel by the pump,
one valve 24 configured to regulate a pressure difference at the terminals of the metering device 22, and
control means formed by an electronic box 26 and able in particular to control the implementation of the method of the invention.

Here the pump 20 is a positive displacement pump. It forms a pumping block able to inject fuel into the combustion chambers 8 by means of the metering device 22. It is assumed here that the pumping block comprises a single pump 20, but the invention applies in the same manner by replacing the pump by a block of several pumps.

The metering device 22 and the valve 24 form a hydro-mechanical metering block 25 or an FMU. The FMU block 25 has the role of metering the quantity of fuel to be injected into the engine 1 and recirculating the excess further upstream in the fuel circuit, upstream of the pump. It is configured to receive fuel from the pump 20 and to communicate it to the injectors 28.

The metering device comprises a sensor 19 of a pressure difference at the terminals of the metering device.

Figure 2:
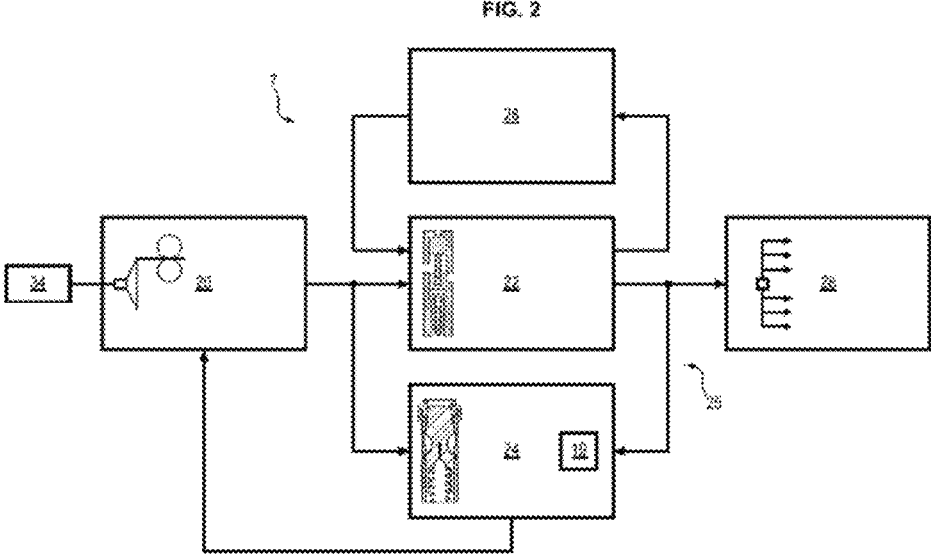
FIG. 2 is a diagram detailing this fuel circuit.

With reference to FIG. 2, the metering circuit 7 extends from a fuel reservoir 34 to the combustion chamber 28. It includes a supply line 11 for the metering device called the high-pressure supply line, linking an outlet of the pump 20 to the inlet of the metering device 22. The metering device is suitable for delivering a target mass flow rate to the injectors 28 of the combustion chamber 8 based on an initial flow rate which is delivered to it by the pump via the line 11. The regulation valve 24 is able to regulate the flow rate delivered to the metering device 22. In particular, it is able to return an excessive fuel flow rate originating at the metering device 22 to the input of the pump 20, depending on the pressure difference at the terminals of the metering device.

For this purpose, the valve 24 comprises a cylinder 31 and a spool 32 mounted slidably in the cylinder 31. We will describe one embodiment of the valve, but other embodiments can be contemplated.

The spool 32 comprises, at its ends, two movement control sections 320, 321 which allow controlling the position of the spool in the cylinder. A first control section 320 is linked to the high-pressure line 11. It therefore received a fuel flow at the same pressure as the fuel delivered at the inlet of the metering device 22. A second control section 321 is linked to an outlet of the metering device.

In addition, the cylinder 31 comprises a first inlet aperture 310 linked to the high-pressure line 11, and a second outlet aperture 311 linked to a low-pressure return line 12, this line linking the aperture 311 to the inlet of the pump 20. What is meant by aperture is an exhaust opening placing an internal cavity of the valve 24 in communication with a fuel circulation line, regardless of the geometry of the opening. For example, an aperture can extend over all or a portion of the circumference of the cylinder.

Depending on its position in the cylinder, the spool 32 is also formed for selectively allowing or prohibiting fluid communication between the apertures 311 and 310, and modulating the flow of fluid circulating from the line 11 to the line 12 while passing through the apertures 310 and 311 of the valve 24, when this fluid communication is allowed.

Figure 3:
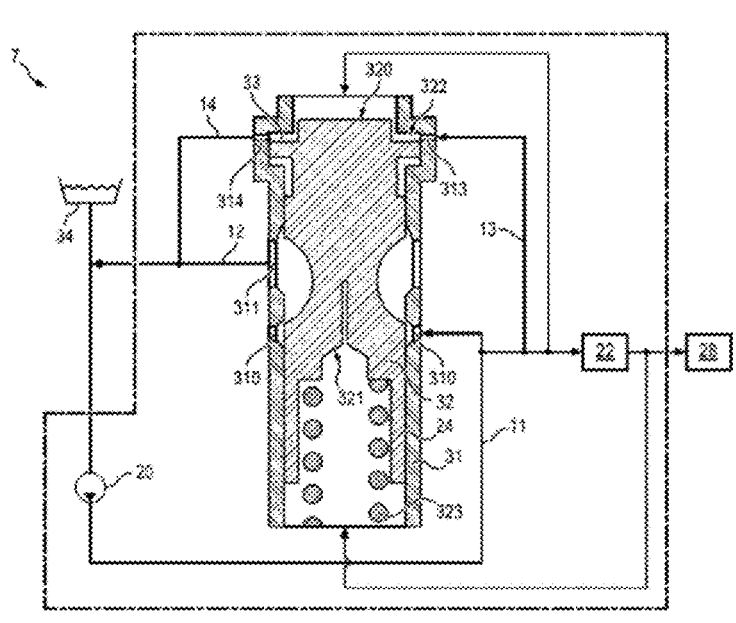
FIG. 3 is a diagram detailing the role of the valve in this circuit.

In particular, an increase in the fuel pressure applied to the first control section 320 causes a movement of the cylinder toward the opposite section (downward in FIG. 3), which tends to free the aperture 11 to increase the recirculated flow rate toward the line 12.

In addition, the valve 24 comprises a return member 323, for example a spring supported against the second control section 321, in order to return the spool into an equilibrium position when the pressure applied to the first control section decreases.

This allows mechanically regulating the fuel pressure difference at the terminals of the metering device, by adapting the opening of the valve to the need for recirculating the surplus flow delivered by the pump.

The pressure difference depends on the equilibrium of the spool of the valve. The stiffness of the spring impacts this equilibrium. To ensure accuracy, it is sometimes useful to set up a system for compensating the effect of the stiffness. This can be accomplished by adding a chamber 33 of which the pressure is modulated by the openings 313 and 314.

A chamber 33 is defined inside the cylinder 31 of the valve, adjacent to an additional control section 322. The chamber is delimited on one side by this additional section, so that the pressure of the fluid contained by the chamber 33 can be exerted on the additional control section 322.

In addition, the cylinder 31 comprises one or more additional apertures 313, 314, these apertures leading into the chamber 33. The metering circuit also comprises a flow rate sampling line 13, of which an upstream end is linked to the high-pressure line 11 and a downstream end is linked to one of the apertures 313. The fuel metering circuit also comprises a flow return line 14, of which an upstream end is linked to the other aperture 314 and a downstream end is linked to the line 12.

This method allows modifying the pressure of the chamber 33 depending on the opening of the valve and thus correcting the effect of the variation of the force induced by the spring on the regulation of the pressure difference at the terminals of the metering device. As a result, unlike the representation of FIG. 4, it is possible to have a nonlinear law of variation of the opening of the regulating valve as a function of ΔP. That does not change the principle and the application of the invention. Hereafter, as an example, we will assume a linear law of variation of ΔP as a function of the opening of the valve.

Principle of the Invention

We will now present the principle of the invention.

The flow rate of the pump 20 is a function of its speed of rotation, to which is applied an efficiency which depends on the speed of rotation, on the pressure difference and on the temperature.

This flow rate is divided by the metering device 22, at a stabilized point, between an injected flow rate and a recirculated flow rate. Most of the recirculated flow rate passes through the regulating valve 24 and depends on the pressure difference at the terminals of the pump 20. Thus, the position of the valve 24 reflects the flow rate delivered by the pump at given temperature, pressure and rotation speed conditions, as well as on to the injected flow rate.

Let us call X the quantity representing the opening cross section of the valve 24, expressed in surface area units. This quantity also represents the position of the spool 32 in the cylinder 31. We can estimate the actual opening $X_{est}$ of the valve when a flow rate $Q \cdot (1 + \varepsilon_{pump})$ passes through it, as well as the calculated opening $X_{calc}$ when it is assumed that the valve has a flow rate Q passing through it, by means of the following formulas (1) and (2):

$$X_{est} = \frac{Q \cdot (1 + \varepsilon_{pump}) \cdot \rho(T) - Wf}{K * \sqrt{\rho(T) \cdot (Php - Plp)}} \qquad (1)$$

$$X_{calc} = \frac{Q \cdot \rho(T) - Wf}{K * \sqrt{\rho(T) \cdot (Php - Plp)}} \qquad (2)$$

Where:
ρ is the fuel density in kg/l,
$W_f$ is the mass flow rate injected by the metering device 22 in kg/h,
$P_{hp}$ is the pressure at the outlet of the pump 20,
$P_{ip}$ is the pressure at the inlet of the pump, and
K is a coefficient specific to the geometry of the valve 24.

We do not have access to the value of the flow rate Q, but only to the speed of rotation of the engine shaft. It is therefore by means of the reduction ratios and of the displacement of the pump that we calculate Q. But if the pump is worn, its efficiency decreases. The functions that we use to know Q based on the speed of rotation are then no longer exact.

During drifting of the pump 20, its flow rate Q decreases. But:

$$Q = W_f + \text{recirculated flow rate}$$

Because the metered flow rate $W_f$ does not decrease, it is the recirculated flow rate that decreases, causing a reduction in the opening X of the valve. In other words, when the pump is worn, the valve is more closed than when the pump was new.

The objective is then to determine as accurately as possible the actual position $X_{est}$ of the valve to quantify the drift of the pump ($\varepsilon_{pump}$) resulting from its aging.

Figure 4:
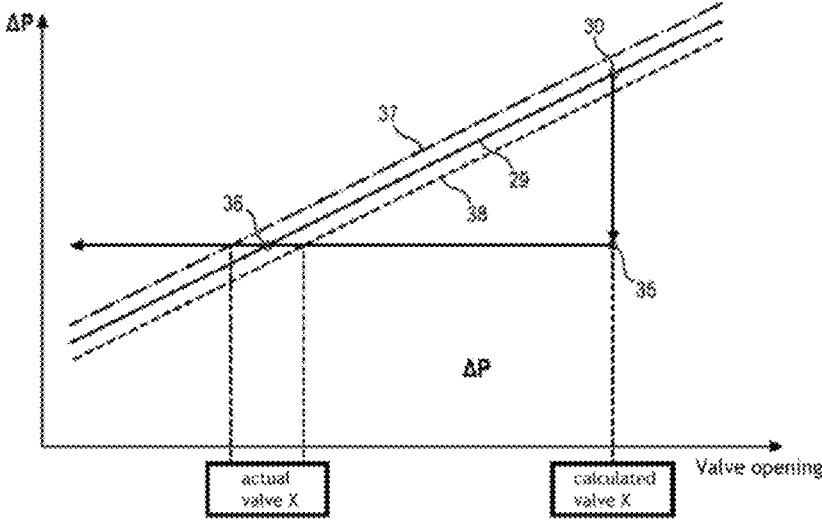
FIG. 4 shows curves of the functions giving the difference in pressure as a function of the position of the valve.

Let us take the example of a linear variation of ΔP as a function of the position of the valve. In reality, this is not necessarily the case, but the principle remains applicable regardless of the form of this law of variation. This applies to the central curve 29 in FIG. 4, showing the linear evolution of ΔP as a function of the opening X of the valve, and conversely. We will specify that this curve 29 was acquired early in the life of each engine (for example upon reception of the equipment). This curve therefore represents the nominal operation of the system.

The equilibrium of the valve is then written with the following formula (3):

$$\Delta P = \frac{(F0 + \text{adjustment}) + k.X}{S} \qquad (3)$$

Where:
ΔP is the control pressure difference, equal to the pressure difference at the terminals of the metering device,
F0+adjustment is the force of the valve spring 323,
k is the stiffness of the spring, and
S is the surface area over which the pressures are applied.

ΔP depends essentially on X. If X varies, ΔP varies. Equation (3) allows calculating a position $X_{est}$ of the valve as a function of the measured value ΔP in the case of a linear valve, and corresponds to the curve 29.

We will observe the drift of the pump through the prism of the variation that it causes in ΔP, the measurement of which is accomplished by the FMU block 25, to improve the accuracy of metering.

Let us assume an early-life operating regime which causes the valve to have a given opening X represented by the point 30 on the curve. With the aging of the pump, the flow rate Q decreases, hence the actual opening X of the valve as well.

The measured value of ΔP decreases but without the system changing its calculated value $X_{est}$ of the opening of the valve. We are therefore located for example at the point 35, located outside of the curve 29. Hence the measured value of ΔP is not consistent with that which it should have for the calculated value of the valve opening X.

Using the reference curve 29, we then look for which actual opening $X_{est}$ of the valve could explain the measured ΔP. This thus involves projecting the measured value of ΔP to the left onto the curve 30 to obtain the abscissa of the point 36. This allows obtaining a value $X_{est}$.

The equilibrium equation (3) is valid on the assumption of a valve without mechanical compensation, i.e. the assumption of a linear law between the pressure difference ΔP and the position X of the valve. The invention not being limited to this ideal case, we specify acquiring the curve 29 early in the life of the engine to have the actual law (including leaks and compensation) linking ΔP to X. Hence the need to project ΔP to the left on the reference curve 29 to obtain the actual value of X.

With the estimated value $X_{est}$ of the opening (or of the position) of the valve thus obtained, we can quantify the drift of the pump relative to the reference curve 29. In fact, it is sufficient to apply formula 4:

$$\%Q = \frac{Xest - Xcalc}{Xcalc + \dfrac{Wf}{K \cdot \sqrt{Php - Plp}}} \qquad (4)$$

This formula arises from the combination of formulas (1) and (2).

In reality, it is difficult to work with simple intersections. In fact, ΔP is not perfectly defined for a given valve opening X. For a given opening X, ΔP will be in a certain range about the curve 29. This range is represented by the two reference curves 37 and 38 located on either side of the reference curve 29 in FIG. 4. Therefore, by projecting to the left, we will not obtain a unique value $X_{est}$, but rather a range of values $[X_{est}1; X_{est}2]$ delimited by the two values $X_{est}1$ and $X_{est}2$ obtained respectively by the curves 37 and 38.

Likewise, a range of values [% QB; % QH] of % Q is thus obtained, delimited by the two values % QB and % QH obtained with these two values $X_{est}1$ and $X_{est}2$. The value % Q represents the drift of the flow rate associated with the aging of the pump. At each calculation of % Q, we obtain the range of values [% QB; % QH] in which is found the actual value of the drift of the pump.

This then involves accomplishing this calculation regularly to make a moving average [% QBm; % QHm] over time of the range [% QB; % QH]. The relevant information is not the calculated range of values % Q but rather its evolution over time. It is due to its evolution that we can observe a "drift" relative to its original behavior. The moving average [% QBm; % QHm] of the range is calculated over a constant sliding period T, movable over time. Each time that a new range of values of % Q is obtained, the moving average is updated.

This moving average of the ranges of % Q is calculated for example in the following manner. Assume that each range of % Q comprises an upper limit % QH and a lower limit % QB and that the average range forming the moving average comprises an upper limit % QHm and a lower limit % QBm. % QHm is calculated as the average of the upper limits % QH and % QBm as the average of the lower limits % QB.

The average range is then compared to a reference range having higher and lower reference limits predetermined during the initial operation of the engine.

It is then sufficient to provide for a predetermined threshold, for example 10%. If a value associated with the moving average of the range of % Q, for example its lower limit % QBm, has a difference of more than 10% relative to the value of the reference lower limit, a warning is triggered indicating a threat to the quality of operation of the pump and requiring maintenance. Depending on the analysis of the desired accuracy, it may be possible to raise a maintenance request bulletin.

All of these elements can be the subject of an acquisition during starting sequences and/or continuously during flight.

Here mention can be made of the subject of turbine engines with variable geometry. These are engines in which the compressor comprises movable fins which, if necessary, allow air to escape to the outside to avoid a pumping effect. These fins are moved by actuators, which themselves are actuated by the fuel acting as a control fluid. Thus the variable geometries are then also supplied by the pump. When the geometries are moved, the metered flow rate remains identical, the flow rate delivered by the pumps remains identical, but the flow rate recirculated by the valve decreases. As a result, peaks or troughs of the value $X_{est}$ are obtained. It can be considered to estimate the flow rate consumed by the movement of the variable geometries and to add it to the recirculated flow rate, but it is preferable to acquire the measurement points implemented in the method on the ground or during cruise, i.e. when the positions of the geometries are known or at least stable and already included in the reference curves acquired early in life.

Generally, gear pumps have a characteristic varying on the order of +/−5%, particularly at low speed. During dimensioning, a design margin is taken by the supplier. This margin is on the order of 15% of the low-speed flow. Thus, accuracy on the order of 10% on the flow rate of the pump estimated by the method of the invention would allow detecting a pump having drifted to the minimum flow rate value allowing its correct operation.

By having set up sensors to improve the accuracy of the metering and an estimate of the density of the fuel and with the use of the acquisition of the rotational speed, we have estimated by studying the influencing variable that an accuracy of plus or minus 5% is obtained for detecting this drift. This estimate can be specified by a study at the system level, by analyzing the different possible curve acquisition scenarios, as well as the other factors which can influence the correct estimation of the flow rate law of the pump, such as for example the impact of transient rotational speeds on the estimate. Providing a continuous analysis of the gap between the estimate flow rate of the pump and that of the reference allows the warning to occur based on a moving average so as to cover the effects of these transients.

Moreover, the control box 26 can serve for improving the reception of the equipment, the accuracy of the metering and its use in the engine. For that purpose, sensors can be set up in order to correct the different uncertainty sets of the hydromechanical block (density, temperature, force of the spring, . . . ).

As has been seen, by adding the sensor 19 of a pressure difference at the terminals of the metering device and by using the rotational speed, it is possible to estimate the flow rate of the pump 20 based on the estimate of the opening of the valve. It is then possible to verify the state of the pump on condition that the accuracy of the estimate is greater than the design margins of the pump.

Implementation Example

The implementation of the method of the invention for estimating a drift of the fuel pump 20 of the turbine engine 1 can therefore comprise the following steps, executed in this order, with reference to FIG. 4.

In step 40 the reference functions 37, 38 are determined after the delivery of the turbine engine and before its commercial exploitation, the functions 37, 38 giving the pressure difference ΔP as a function of the position of the valve. To this end, sensors set up on the FMU block for other inputs (accuracy, detection of breakdowns, . . . ) are used. In the non-linear case, each of the functions 37 38 is represented by a table of pairs of values recorded in the control means.

The following steps are implemented during the exploitation of the turbine engine.

In step 42, the speed of the pump 20 is determined, then its flow rate Q is calculated.

In step 44, a pressure difference ΔP is measured at the terminals of the metering device 22 by means of the sensor 19. Moreover, the position $X_{calc}$ of the valve 24 is calculated by means of equation (2).

In step 46, two estimated positions $X_{est}1$, $X_{est}2$ of the valve are determined based on the pressure difference ΔP and the two reference functions 37, 38, which comes down to projecting the point 35 of FIG. 4 onto each of the curves 37, 38 to obtain the estimated positions.

In step 48, two instantaneous values % QB and % QH are calculated by means of the calculated position $X_{calc}$, the estimated positions $X_{est}1$, $X_{est}2$ and equation 4. % QB and % QH are the limits of the array or range of % Q.

In step 50, these values % QB and % QH serve for calculating a moving average [% QBm; % QHm] of the range of % Q over a predetermined period of time T. For this purpose, movable averages of % QB and of % QH are determined. Thus the moving averages of the limits of the range are calculated. During the first cycles, each average is calculated by taking into account all the available corresponding values. Then, when the initial period T has expired, each average is recalculated for the values of the most recent period T to update it. Thus, by means of the instantaneous values % QB and % QH, the two average values % $QB_m$, % $QH_m$ representing the limits of the moving average of the range of the drift of the pump 20 are updated.

Finally, at least one of the values % $QB_m$, % $QH_m$ is compared with the predetermined threshold. If the calculated gap(s) exceed the threshold, a warning is triggered regarding the degree of aging of the pump.

Complements

Due to the acquisition of parameters and the characterization of the behavior of the valve 24 during the reception of the equipment or of the engine, the invention allows comparing in real time the theoretical opening and the actual opening of the valve estimated by means of the measurement of ΔP, and to deduce from it a gap in the behavior of the pump.

FIG. 6 gives an overview of the expected data and illustrates an estimation of what a curve of % Q could give as a function of time. Each vertical strip 64 is the result of a measurement and represents the range of values [% QB; % QH] in which the actual value of the drift % Q of the flow rate of the pump is located. Over time, these ranges will move downward.

The central transparent banner 60 represents the relevant information. This is the moving average [% QBm; % QHm] of the ranges 60 of drift of the pump. It represents the measurements carried out during the life of the engine. It is then observed that the blue banner drifts progressively relative to its initial value. It is then possible to determine a warning threshold.

In this example, the curves 29, 37 and 38 are the result of a nonlinear modeling of the valve, which has as its consequence that the strips do not all have the same amplitude, while they would have been the same with a linear pump.

For the calculation of the moving average [% QBm; % QHm], % QBm is determined as the maximum of the % QB values during the sliding period and % QHm as the maximum of the % QH values during the same period.

The curve 62 represents the actual drift of the pump.

The time unit in the abscissa can be selected in different ways. The drift range could thus be determined and the moving average updated once per flight or once in every ten flights, for example.

In FIG. 7 is illustrated an example of the appearance of a nonlinear curve of ΔP as a function of the position X. In this case, the same curve leads to obtaining several values X1 to X5 for the estimated position of the valve. Several separate ranges are thus obtained for % Q or even one range with several separate segments. In this case, the step of calculating the average range [% QBm; % QHm] implements the determination of the intersection of the ranges during the period, which tends to obtain an average range [% QBm; % QHm] with a single segment.

The invention does not necessitate a specific position sensor on the valve 24 which would be usable only for this monitoring and would cause an increase in cost.

Numerous modifications can be applied to the invention without departing from its scope.

In a simplified but less accurate version, the method comprises the following steps:

calculating a position $X_{calc}$ of the valve 24;
  determining an estimated position $X_{est}$ of the valve based on a measurement of the pressure difference and on a reference function 29 giving the pressure difference ΔP as a function of the position;
  calculating a value % $Q_m$ representing a drift of the pump 20 by means of the calculated position $X_{calc}$ and of the estimated position $X_{est}$; and
  comparing the value with a predetermined threshold.

The invention claimed is:

1. A method for estimating a drift of a turbine engine fuel pump,
  the method comprising performing the following steps:
  measuring a pressure difference at terminals of a metering device supplied with fuel by a turbine engine fuel pump;
  calculating a position of a valve regulating the pressure difference;
  determining at least one estimated position of the valve based on the pressure difference and on at least one reference function giving the pressure difference as a function of the position;
  calculating at least one value representing a drift of the pump by means of the calculated position and of the estimated position; and
  comparing the value with a predetermined threshold.

2. The method according to claim 1 which comprises a determination of the reference function.

3. The method according to claim 2, wherein the determination of the function occurs after a delivery of the turbine engine and prior to a commercial exploitation of the turbine engine.

4. The method according to claim 1 wherein:
  two estimated positions of the valve are determined based on the pressure difference and on two reference functions giving the pressure difference as a function of the position;
  two values are calculated representing the drift of the pump by means of the calculated position and of the estimated positions; and at least one of the values is compared with the predetermined threshold.

5. The method according to claim 1, wherein:

at least one instantaneous value is calculated by means of the calculated position and of the estimated position; and at least one average value representing the drift of the pump is updated by means of the instantaneous value.

6. The method according to claim 1, wherein:

two instantaneous values are calculated by means of the calculated position and of the estimated positions; and two average values representing the drift of the pump are updated by means of the instantaneous values.

7. The method according to claim 5, wherein the or each average value is a moving average.

8. A turbine engine fuel circuit, the circuit comprising:

at least one pump, one metering device, the circuit being configured for supplying the metering device with fuel by the pump, the metering device comprising a sensor of a pressure difference at terminals of the metering device, one valve configured to regulate a pressure difference at the terminals, and means able configured to control the implementation of a method according to claim 1.

9. The circuit according to claim 8 wherein the pump is a positive displacement pump.

10. A turbine engine comprising a fuel circuit according to claim 8.

* * * * *